2 Sheets—Sheet 1

T. KERSHAW
Spooling-Machine.

No. 202,549. Patented April 16, 1878.

Witnesses
Saml. J. Van Stavoren
Jos. B. Connolly

Inventor
Thomas Kershaw
By Connolly Bros
Attorneys

T. KERSHAW.
Spooling-Machine.
No. 202,549. Patented April 16, 1878.
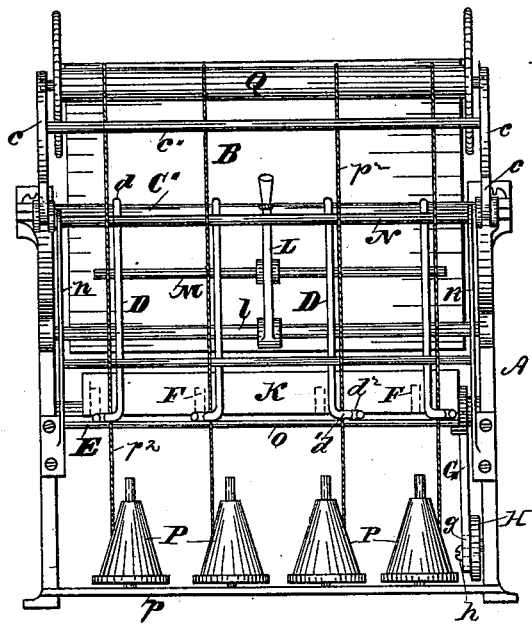
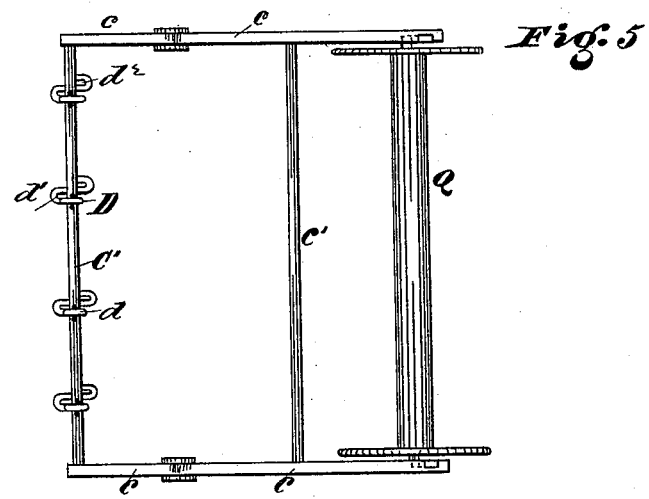
Witnesses
Saml. J. Van Staveren
Jos. B. Connolly
Inventor
Thomas Kershaw
By Connolly Bros
Attorneys

UNITED STATES PATENT OFFICE.

THOMAS KERSHAW, OF PHILADELPHIA, PENNSYLVANIA.

IMPROVEMENT IN SPOOLING-MACHINES.

Specification forming part of Letters Patent No. 202,549, dated April 16, 1878; application filed June 2, 1877.

*To all whom it may concern:*

Be it known that I, THOMAS KERSHAW, of Philadelphia, in the county of Philadelphia, State of Pennsylvania, have invented certain new and useful Improvements in Spooling-Machines, whereof the following is a full, clear, and exact description, reference being had to the accompanying drawings, forming part of this specification, wherein—

Figure 1:
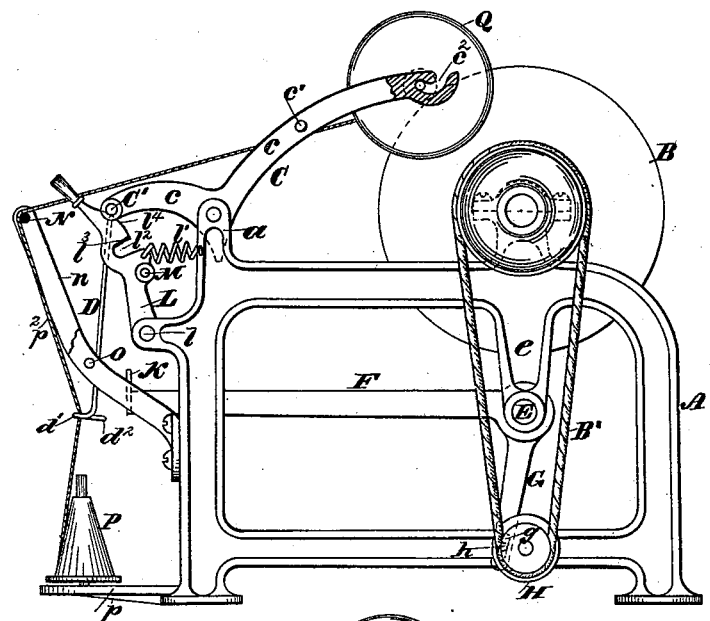
Figure 2:
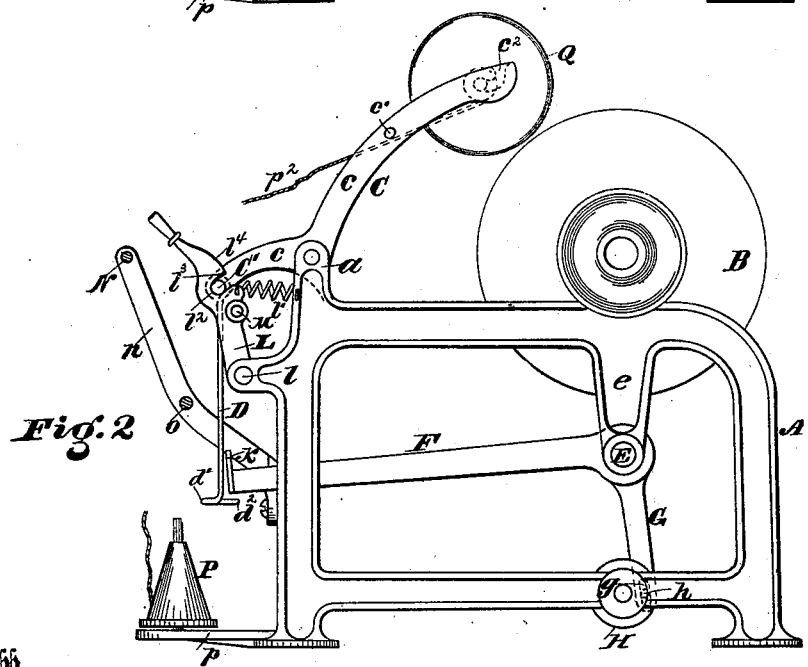
Figure 3:
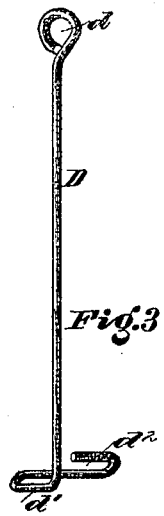

Figures 1 and 2 are side elevations. Fig. 3 is a perspective view of one of the needles. Fig. 4 is a front elevation of the machine, and Fig. 5 is a plan view of the spooling-frame.

My improvements have for their object to cause a stoppage of the spooling or reeling when a strand of the cotton or yarn being spooled breaks, or when the spool is filled; and my invention consists in the peculiar construction and combination of parts hereinafter set forth.

Referring to the drawings, A indicates the main frame of the machine, on which is mounted the driving-cylinder B. C represents the spool-frame, consisting of two curved bell-crank levers, $c\ c$, united by a cross-bar, $c^1$, and having their fulcra on standards $a\ a$ mounted on the main frame A. The upper extremities of the levers $c\ c$ are formed with curved slots or grooves $c^2\ c^2$, as shown, for the reception of the spool spindles or journals. The lower extremities of said levers are connected by a rod, C', on which are hung trip-wires D. The trip-wires D, of which any desirable number—four, for example—may be employed, are formed with an eye, $d$, at one end, the opposite extremity being bent to form an eye, $d^1$, and lip $d^2$.

E represents a shaft sustained in hangers $e\ e$ affixed to the frame A, and provided with horizontal arms F F and a vertical arm, G, as shown. H is a pulley sustained on the hanger $e$, having a wrist-pin, $h$, which enters a vertical slot, $g$, in the arm G. The pulley H is driven by a band, B', from the driving-cylinder, communicating a rocking motion to the shaft E and a vertical reciprocating motion to a broad bar or plate, K, affixed to the forward ends of the arms F F.

L represents a latch or lever pivoted to the frame A at $l$, and provided with a spring, $l^1$, which tends to draw the upper part of said lever, turning on its pivot $l$ toward said frame A. Said lever is curved on its upper side, as shown at $l^4$, where it bears against the rod C', and is formed with a notch, $l^2$, the upper side of which is beveled or inclined, as shown at $l^3$. M is a rod or bar affixed to the lever L, and extending from end to end of the machine. N is a rod or shaft over which the strands from the bobbins pass, said rod being sustained in its bracket $n$, in such position that when tension is produced on said strands, which pass through the eyes $d^1$ of the wires D, said wires will be swung out of perpendicular and against the rod $o$, which is also sustained in said bracket $n$, and designed to prevent the said wires from swinging too far away from the bar K. P represent bobbins arranged on a stand, $p$.

The operation is as follows: The strands or threads from the bobbins are carried up outside the rod N, passing through the eyes $d^1$ of the trip-wires and around the drum of the spool Q, which is made to press against the cylinder B by the action of the spring $l^1$, which, causing the lever L to bear against the rod C', depresses the upper extremity of the spool-frame toward said cylinder B. While the spooling is properly progressing, the tension on the threads or strands $p^2$ holds the trip-wires out of perpendicular, so that the bar or plate K moves up and down without interference with the lips $d^2$. When, however, a strand or thread breaks or a bobbin runs out, the trip-wire through the eye of which the same passed falls into a perpendicular line. If the bar K be at the same moment elevated, the lip $d^2$ will pass beneath said bar. If the bar K, at the moment mentioned, be depressed, the lip $d^2$ will strike its face and pass beneath it, when said bar rises. On the downward movement of the bar K it carries the trip-wire engaging with it along, depressing the lower end of the spool-frame C, and raising its upper end, so as to relieve the spool Q from contact with the driving-cylinder B. The lowering motion just described brings the rod C' opposite the notch $l^2$, which said rod accordingly enters. The spring $l^1$ now draws the lever L toward the frame A, causing the rod C', with the lower end of the spool-frame C, to be further depressed, owing to the beveled or inclined upper side of the notch $l^2$. This lowering of the rod C' carries the trip-wire D down so far that the bar K will not now meet or strike the lip $d^2$. The bar C' remaining in the notch $l^2$, the spool is out of contact with the cylinder B, and the broken strand may be repaired or the run-out bobbin replenished. As soon as the repair or replenishment is accomplished the lever L is drawn outwardly, by taking hold of its upper end, far enough to cause the rod M to hold the trip-wires D out of perpendicular and the lips $d^2$ out of contact with the bar K, until the necessary tension on the strands for holding said wires in such position is obtained by the rotation of the spool under the influence of the driving-cylinder B, the spool-frame falling into position when the lever L is so moved outwardly. While the spool is filling, the cylinder B bears against the cotton or yarn being wound on the former, and as the quantity of such yarn on the spool is constantly increasing the spool itself is being continually moved farther away from the said cylinder, thus elevating the upper and depressing the lower end of the frame C. As soon as the spool is filled the lower end of the frame C is so far depressed that the rod C' will enter the notch $l^2$, and the stoppage of the spooling, as already described, will be effected.

What I claim as my invention is—

1. In a spooling-machine, the combination, with the trip-wires and spooling-frame, of rock-shaft E, having arms F and G, with the crank-pulley H, said arms F F sustaining the bar K, and the arm G being slotted at $g$ for the reception of the crank-pin $h$, substantially as shown and described.

2. The spring-actuated lever L, having its upper and inner side curved for the purpose of pressing the spool against the driving-cylinder, as set forth.

3. In combination with the lever L, the bar or rod M, for moving the trip-wires out of a vertical line and out of contact with the reciprocating bar K, substantially as shown and set forth.

4. The combination of pivoted spool-frame C with the trip wire or wires D, hung upon said frame, and a bar, K, that engages with and depresses said wires when one of the latter is swung to a vertical line, as set forth.

5. The combination of spool-frame C, trip wire or wires D, notched lever L, and bar K, substantially as shown and described.

6. The trip-wire D, adapted for suspension in a spooling or equivalent machine, and formed with an eye, $d^1$, for the passage of the bobbin-thread and lip $d^2$, substantially as and for the purposes set forth.

THOMAS KERSHAW.

Witnesses:
H. K. SMITH,
EDWIN F. GLENN.